United States Patent
Rodgers

(10) Patent No.: US 7,697,537 B2
(45) Date of Patent: Apr. 13, 2010

(54) SYSTEM AND METHOD FOR USING GENERIC COMPARATORS WITH FIRMWARE INTERFACE TO ASSIST VIDEO/AUDIO DECODERS IN ACHIEVING FRAME SYNC

(75) Inventor: Stephane W. Rodgers, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 786 days.

(21) Appl. No.: 11/385,307

(22) Filed: Mar. 21, 2006

(65) Prior Publication Data

US 2007/0223538 A1 Sep. 27, 2007

(51) Int. Cl.
*H04J 3/06* (2006.01)
(52) U.S. Cl. .................. 370/394; 370/392; 370/503
(58) Field of Classification Search .......... 370/394, 370/503, 395
See application file for complete search history.

(56) References Cited

U.S. PATENT DOCUMENTS

| | | | |
|---|---|---|---|
| 4,473,904 A | | 9/1984 | Suehiro et al. |
| 5,021,897 A | * | 6/1991 | Yoshino et al. ............ 360/72.2 |
| 5,638,370 A | | 6/1997 | Seconi et al. |
| 5,831,678 A | * | 11/1998 | Proctor ................... 375/240.22 |
| 6,263,469 B1 | * | 7/2001 | Jang .......................... 714/775 |
| 6,598,034 B1 | * | 7/2003 | Kloth .......................... 706/47 |
| 6,665,725 B1 | * | 12/2003 | Dietz et al. .................. 709/230 |
| 6,717,952 B2 | | 4/2004 | Jones et al. |
| 6,738,846 B1 | | 5/2004 | Slaughter et al. |
| 6,925,052 B1 | | 8/2005 | Reynolds et al. |
| 7,039,048 B1 | | 5/2006 | Monta et al. |
| 2002/0150123 A1 | * | 10/2002 | Ro ............................ 370/465 |
| 2005/0015794 A1 | | 1/2005 | Roelens |
| 2005/0091057 A1 | * | 4/2005 | Phillips et al. ........... 704/270.1 |
| 2005/0132264 A1 | | 6/2005 | Joshi et al. |
| 2006/0029139 A1 | * | 2/2006 | Teichner et al. ........ 375/240.28 |

\* cited by examiner

*Primary Examiner*—Dang T Ton
*Assistant Examiner*—Pamit Kaur
(74) *Attorney, Agent, or Firm*—McAndrews, Held & Malloy, Ltd.

(57) ABSTRACT

A method and system are provided for using generic comparators with firmware interface to assist video/audio decoders in achieving frame sync. The method may involve processing a portion of an incoming packet by hardware components, which may result in a partially processed packet. The incoming packet may comprise audio, video, and/or record data. The partially processed packet may then be completely processed by firmware and sent to decoders if comprising audio/video data or to a record engine if comprising record data. Generic comparators may be utilized with the incoming packet to search for data patterns associated with synchronization information within the packet. The extracted data patterns may be sent to the firmware to utilize while processing the partially processed packet. The firmware may send synchronization information determined based on the extracted data patterns to aid decoders in decoding audio and video content.

21 Claims, 3 Drawing Sheets

SYSTEM AND METHOD FOR USING GENERIC COMPARATORS WITH FIRMWARE INTERFACE TO ASSIST VIDEO/AUDIO DECODERS IN ACHIEVING FRAME SYNC

RELATED APPLICATIONS

This application is related to the following applications, each of which is incorporated herein by reference in its entirety:

U.S. patent application Ser. No. 11/348,563 filed Feb. 7, 2006;

U.S. patent application Ser. No. 11/385,468 filed Mar. 21, 2006;

U.S. patent application Ser. No. 11/328,877 filed Jan. 10, 2006; and

U.S. patent application Ser. No. 11/394,877 filed Mar. 31, 2006.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

In systems that receive and process data packets with multiple layers such as, for example, a video/audio system, syncs within the data need to be detected for the sub-layers to be extracted for accurate processing. In a video/audio system comprising hardware and firmware components, where the firmware would have the responsibility of handling such issues as performing sync detects, the firmware performs a very intensive process. Additionally, because data that comes after the sync pattern is not typically byte-aligned, extracting such data can be even more time intensive. The firmware may also perform many shift and mask instructions, which uses up processor resources.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for using generic comparators with firmware interface to assist video/audio decoders in achieving frame sync, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

Figure 1:
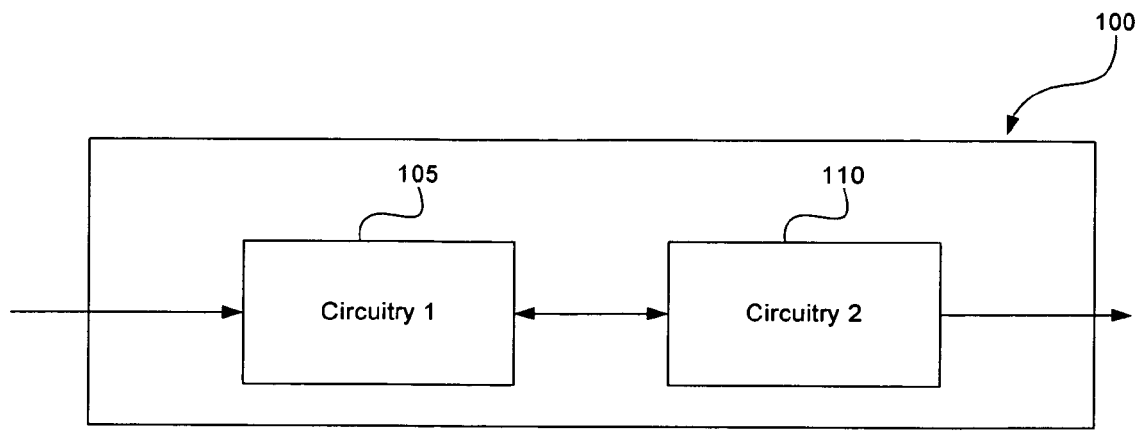
FIG. 1 illustrates an exemplary architecture of a system, in accordance with an embodiment of the present invention.

Certain embodiments of the present invention relate to processing video and audio signals. More specifically, certain embodiments of the invention relate to a method and system for using generic comparators with firmware interface to assist video/audio decoders in achieving frame sync.

In video/audio systems it may be desirable to support certain functions that may be handled by modern transport demultiplexers. Such functions may include, for example, receiving several streams which have been multiplexed together, and separating out whole streams or sub-streams at user discretion; parsing input formats such as, for example, MPEG Transport, Directv Transport, raw PES, DVD, raw ES, and a variety of other formats; recognizing start code or frame synchronization patterns from several different ES layers; assisting in the frame synchronization for video and audio; providing ancillary information about the incoming data to assist the downstream audio or video decoders; providing timestamp management support; providing methods for synchronizing commands from software with the data stream; providing flexibility to support new, as-yet unanticipated formats, and being able to do all of the aforementioned functions at high speeds such as, for example, 200+Mbits/sec. In this regard, a fast yet programmable solution may be desirable. Such a solution may utilize a double buffer and/or a hardware assist and may be implemented in a record audio video engine (RAVE).

In an embodiment of the invention, a RAVE may support multiple decoders that support audio and/or video decoding. The RAVE may also support software for recording PVR data and accessing record data for video playback. Therefore, the RAVE may be a block that combines record functionalities and the audio/video transport parsing and demultiplexing functions. The RAVE may be capable of processing packets associated with each of the video decoding, audio decoding, and the record functions. The RAVE may also be capable of processing fixed-length sections of non-transport data. The RAVE may be designed such that it may provide flexibility to allow for subsequent algorithmic changes as may be needed by data format changes, for example. Additionally, the RAVE may maintain a high throughput. The RAVE may comprise hardware and firmware, which may work together to process data packets as to benefit from the flexibility of the firmware and the speed of the hardware.

As the bit rate of a compressed stream increases, and as the complexity level of the decoding algorithms also increases, video and audio decoders may have less time to spend performing frame synchronization. As a result, offloading some of the burden of frame synchronization to the transport demultiplexer becomes desirable. To help with the frame synchronization function, the RAVE can parse the ES layer. The information resulting from this parsing function may be conveyed to the video/audio decoders in an ancillary buffer called ITB (Index Table Buffer), and may be used by these decoders to perform the frame synchronization function, as well as other various functions.

Identifying synchronization patterns in a data stream may be a step in assisting with the frame synchronization function. To realize this function, the RAVE may utilize generic comparators, which may assist in identifying patterns in the packet data, and which in turn allows firmware to assist the downstream audio/video decoders in performing the frame sync function. Generic comparators may be used so that other formats that may be later developed may be easily supported with a simple configuration change.

The comparators may scan incoming packet data for a configured pattern associated with the data format. Several patterns may be scanned for each data stream such as, for example, patterns associated with audio and video content. When a compare pattern is found, the comparators may skip a predetermined number of bits, extract another specified number of bits from the stream, align the extracted bits to the nearest byte boundary, calculate the packet byte offset of the last byte of extracted data, and send the extracted data plus the packet byte offset to RAVE's internal data memory. The above operations may be configurable, such that the pattern to be compared, the number of bits to skip, the number of bits to extract, and the method of alignment, for example, may be programmable on a per-stream basis based on the format type of the stream. This may allow a single hardware block to support multiple video and audio formats with configuration that changes based on the stream type. It may also allow future, later-developed formats to be supported easily with no change to hardware, but instead a change in configuration.

On the next packet time, after the compare, skip, extract, and align operations have taken place, the firmware may enter a loop where it gathers all the data extracted by the comparators, and then may write them to special addresses, which may consequently send them to the main external memory buffer known as ITB.

As a result, two buffers may be created in memory. The first buffer may be a CDB buffer, which may contain the compressed data, and the second buffer may be an ITB buffer, which may contain ancillary information about the stream with pointers to various data structures inside the CDB. Some of the ancillary information may represent the frame sync data, which was extracted and aligned by the generic comparators, and placed into the ITB by firmware. The video/audio decoders may then use this ITB information to provide frame synchronization functions on the incoming stream.

FIG. 1 illustrates an exemplary architecture of a system 100, in accordance with an embodiment of the present invention. The system 100 may comprise a first circuitry 105 and a second circuitry 110. The system 100 processes incoming packets, where the first circuitry 105 partially processes a portion of a first packet, resulting in a partially processed first packet. The second circuitry 110 executes a set of instructions to process the remainder of the partially processed first packet. The first circuitry 105 partially processes a second packet while the second circuitry 110 is processing the remainder of the first packet. When the second circuitry 110 completes processing the first packet, the second circuitry 110 begins processing the remainder of the partially processed second packet, and at the same time, the first circuitry 105 partially processes a third packet. The processing continues where the first circuitry 105 partially processes a packet, while the second circuitry 110 processes the remainder of the partially processed previous packet. This method of processing a packet in a system such as, for example, the system 100 is described in detail in U.S. patent application Ser. No. 11/348,563 filed Feb. 7, 2006. Accordingly, U.S. patent application Ser. No. 11/348,563 filed Feb. 7, 2006 is hereby incorporated herein by reference in its entirety.

Figure 2:
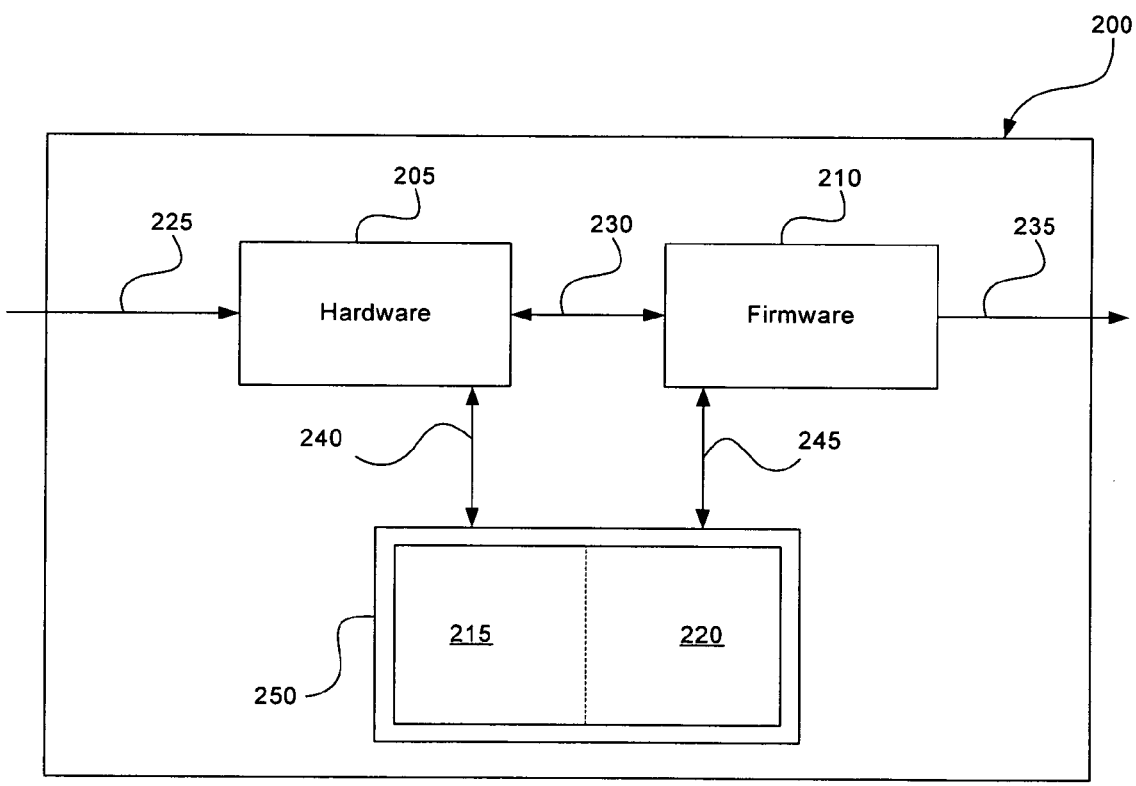
FIG. 2 illustrates a block diagram of exemplary architecture of a system, in accordance with an embodiment of the present invention.

FIG. 2 illustrates a block diagram of exemplary architecture of a system 200, in accordance with an embodiment of the present invention. The system 200 may comprise a hardware assist block 205, a firmware block 210, and a memory block 250. The input 225 may comprise input data, where the input data may comprise packets of video, audio, and record data in any number of formats. The hardware assist block 205 may then perform some processes and pass processed data to firmware block 210, either directly via data path 230 or indirectly via the buffer block 250. A portion of the processed data may be passed from the hardware assist block 205 via data path 240 to the memory block 250, which may then be accessed by the firmware block 210 via data path 245. U.S. patent application Ser. No. 11/385,468 filed Mar. 21, 2006, discusses several approaches of interfacing the hardware assist 205 and the firmware 210. Accordingly, U.S. patent application Ser. No. 11/385,468 filed Mar. 21, 2006, is hereby incorporated herein by reference in its entirety.

A current packet, packet A, may come into the system 200 via input 225. The hardware assist 205 may perform a portion of the functions associated with the processing of packet A, and may retrieve information associated with packet A as well. The hardware assist 205 may then set up the hardware assist fields and may write retrieved information to a location in the memory block 250 such as, for example, a buffer 215. The hardware assist field may comprise, for example, address of compare pattern, compare patterns, staff/end of PES headers, number of ES bytes in the packet, number of payload bytes in the packet, start of payload, presence of packet errors, type of packet (record or audio/video), etc. These fields and their uses are explored further in U.S. patent application Ser. No. 11/385,468 filed Mar. 21, 2006, and U.S. patent application Ser. No. 11/328,877 filed Jan. 10, 2006. Accordingly, each of U.S. patent application Ser. No. 11/385,468 filed Mar. 21, 2006, and U.S. patent application Ser. No. 11/328,877 filed Jan. 10, 2006, is incorporated herein by reference in its entirety.

After the hardware assist 205 performs the portion of the functions assisted with the first packet A, the firmware 210 may then access and begin processing the data associated with the first packet A from the buffer 215, and output the processed data A. Meanwhile, while the firmware 210 is processing the previously received first packet A, the hardware assist 205 may process packet B (a second packet) and write the associated retrieved data in another location in the memory block 250 such as, for example, a buffer 220. The firmware 210 may then begin processing the packet B from the buffer 220, and the hardware assist 205 may process the next packet C (a third packet) and write the associated information in the buffer 215, overwriting the data associated with the packet A previously processed by the firmware 210.

In an embodiment of the invention, generic comparators may be utilized in the system 200 to detect certain data patterns within the data packets. The generic comparators may be dynamically configured to trap on different compare patterns per context, with different number of compare pattern lengths and mask bits. While the hardware assist 205 may be processing a data packet, the generic comparators may identify frame syncs within the data and extract the data associated with the frame sync, which the firmware 210 may utilize in further processing of the data packets. The comparators may extract data from the stream at any bit boundary location and put the data into a format that is easily processed by the firmware 210. The generic comparators may provide the speed of hardware-based comparators while providing flexibility of a full firmware-based solution. Compare and extract operations associated with the firmware 210 may as a result function as fast as hardware, with flexibility associated with firmware 210. In certain embodiments where the compare pattern may be too long for the comparators to detect, the firmware 210 may set up the comparators to detect part of the pattern and then finish comparison of the remainder of the pattern manually using a software solution. Using the comparators may also assist downstream audio/video decoders in achieving frame sync, where sync information may be utilized in more efficient decoding of the audio and video content.

The comparators may scan incoming packet data for a configured pattern associated with the data format. Several patterns may be scanned for each data stream such as, for example, patterns associated with audio and video content. When a compare pattern is found, the comparators may skip a predetermined number of bits, extract another specified number of bits from the stream, align the extracted bits to the nearest byte boundary, calculate the packet byte offset of the last byte of extracted data, and send the extracted data plus the packet byte offset to data memory. Additionally, a "valid byte" may also be sent to data memory that may contain miscellaneous information including the comparator from which this extracted data originated. A running count of the number of compare patterns seen in the current packet may be kept by the hardware portion of the RAVE. At the end of the packet time, this count may be sent to data memory at a location just above the first compare pattern.

At the next packet time, the firmware 210 may look at the pattern count, and check to see whether there are any sync patterns in the current packet. If there is at least one, the firmware 210 may enter a loop where it reads the stream-extracted data provided by the comparators, and write them to an address that causes the data to be loaded into an ITB entry. These ITB entries may then be utilized by downstream video/audio decoders to decode the data packets.

Utilizing the generic comparators may provide flexibility for usage with a variety of data formats as well as new data formats, while providing enough hardware assist 205 to enable the firmware 210 to meet its throughput requirements. As such, the comparators implemented in the system 200 may be generically configured to trap on a large variety of patterns, and can trap on a different set of patterns for each supported context. The comparators may also extract data at a location somewhere after the compare pattern is seen, align it, format it in such a way that it can be used efficiently by the firmware 210, and then write the extracted data to data memory 250 for use by the firmware 210 at the next packet time.

Figure 3:
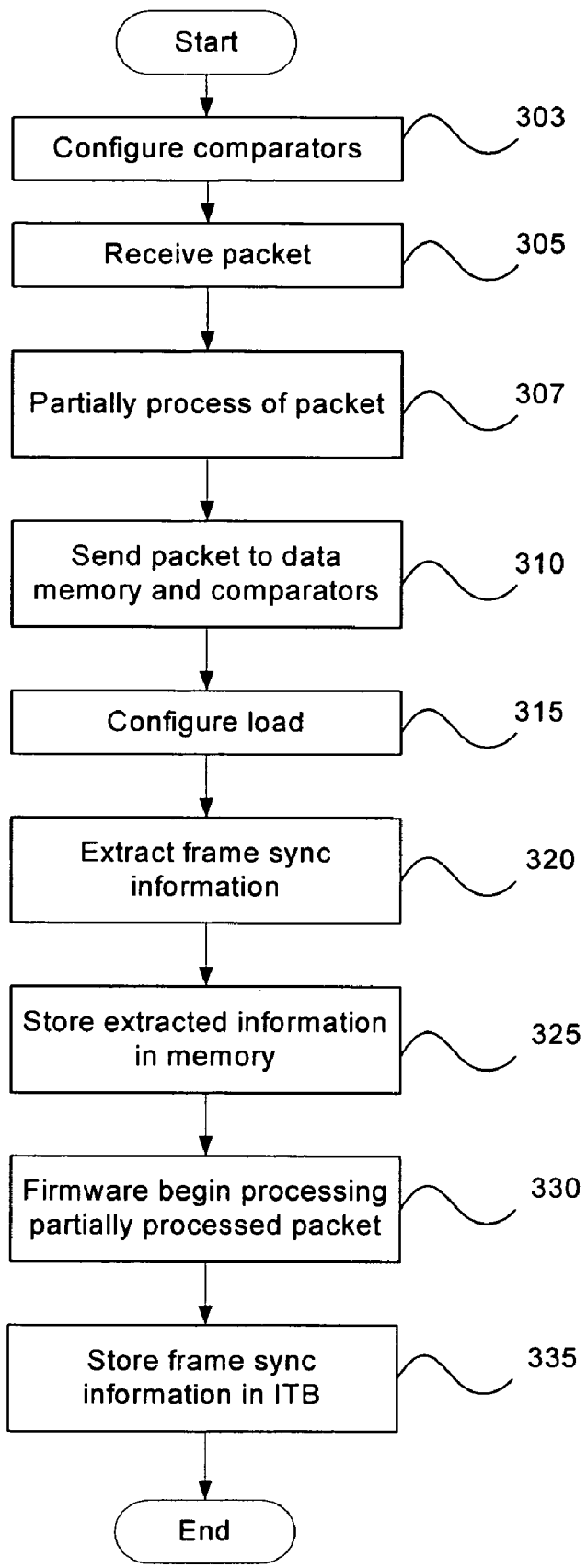
FIG. 3 illustrates a flow chart of a method for using generic comparators to assist in achieving frame sync, in accordance with an embodiment of the present invention.

FIG. 3 illustrates a flow chart of a method for using generic comparators to assist in achieving frame sync, in accordance with an embodiment of the present invention. At 303 the generic comparators may be configured by the firmware based on the data format. At 305 the packet may be received, where the packet may comprise, for example, audio/video data. The hardware assist may partially process the data packet at 307. As a result of the partial processing of the packet, the packet may be parsed to determine where the ES data may begin and end. The hardware assist, in partially processing the packet may determine information related to the type of packet, all the fields associated with the packets, and where they are within the packet, in addition to where the ES data is, where it begins and where it ends. For example, in an MPEG packet, the hardware assist may determine where the audio and video ES layer is within the packets, since they will be in different locations.

The packet may then go to two destinations, the data memory and the generic comparators, at 310. The generic comparators may then be loaded dynamically with configuration data on a packet-by-packet basis, where the configuration data that is loaded may depend on the format of the stream. This may allow multiple-stream formats with different comparator settings to be supported in a single multiplexed stream. Once loaded with their configuration data at the start of the packet time, the comparators may be configured to look for a certain data patterns associated with the data format. Using the above-mentioned example of an MPEG packet, the comparators may extract information associated with the frame sync for the audio data and the frame sync for the video data. When the comparators find the particular pattern for which they are searching, the comparators will extract the appropriate bits that provide frame sync information for the current packet at 320. The comparators may then store the extracted information into a location in the data memory at 325. Once the hardware assist completes preprocessing the packet, and the comparators complete their portion of the processing of the packet, the firmware may begin processing the partially processed packet at 330. Part of the processing performed by the firmware may involve going through the compare patterns that the comparators extracted for the packet being processed by the firmware. The firmware may then sort the compare patterns indicating the frame syncs and place them in an associated ITB entry at 335. The ITB may be in a separate buffer called an ITB buffer that may be used by the audio or video decoders.

The information that the comparators may be looking for may be a pattern of bits in a row that may be format specific. For example, for the AC3 format, the frame sync pattern that the comparators may be looking for may be, for example, the pattern 0B77 (in hex). When the comparators recognize this pattern, the comparators may skip a few bits, the number of which may be programmed into the comparators, and extract a chunk of bits after that, the size of the chunk of extracted bits may also be programmed into the comparators. The extracted chunk of bits may be the frame sync, and the comparators may put that into a temporary holding buffer, then into a memory location associated with data extracted by the comparators. The firmware may then process that frame sync data and store it in an ITB entry in an ITB buffer. That frame sync data may later be utilized by the audio and video decoders when decoding the packet to assist in the decoding process. When an audio or video decoder prepares to decode a processed packet, which after being processed by the firmware may be stored in the data memory, the decoder may access the frame sync data associated with a packet from the ITB buffer. The decoder may then access the packet from the data memory and use the accessed frame sync data to decode the packet. Since the comparators are generic comparators, they may be utilized with audio or video content and any data format, and this provides flexibility in the system design.

Figure 4:
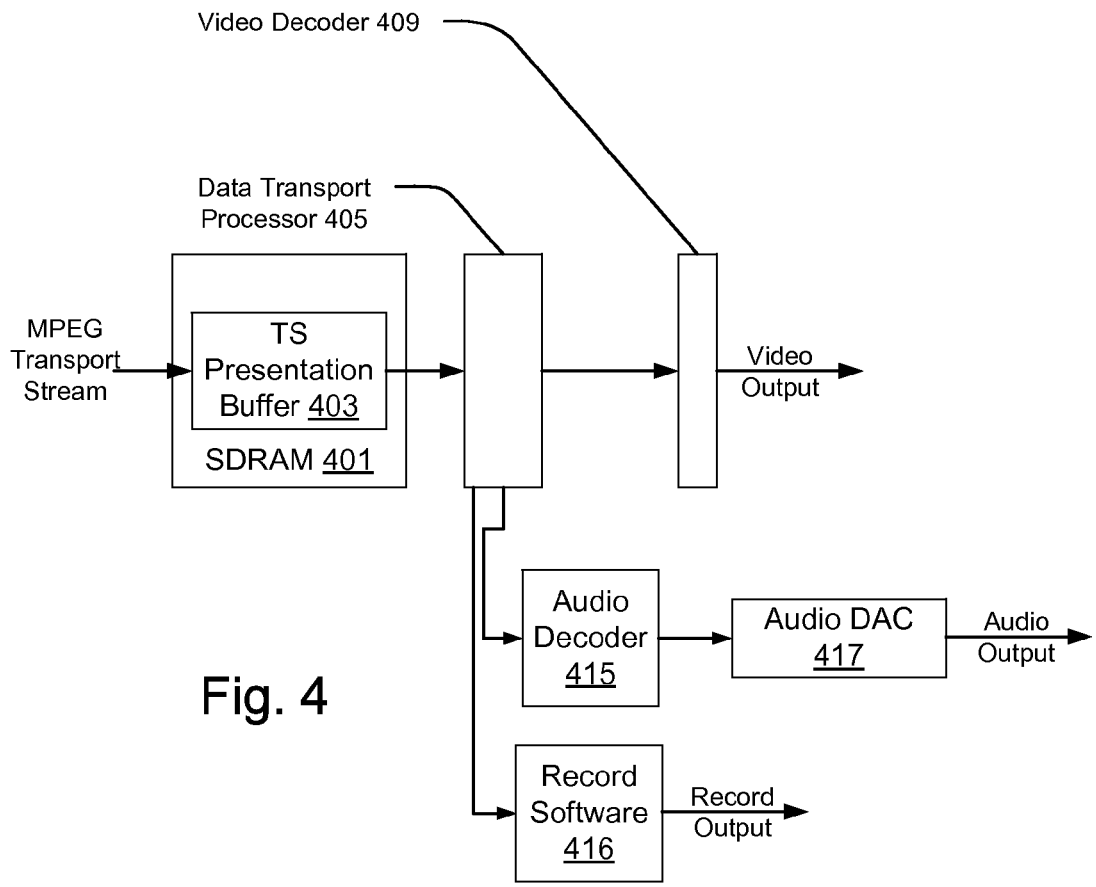
FIG. 4 illustrates a block diagram of an exemplary circuit for decoding compressed video data, in accordance with an embodiment of the present invention.

FIG. 4 illustrates a block diagram of an exemplary circuit for decoding compressed video data, in accordance with an embodiment of the present invention. Data may be received and stored in a presentation buffer 403 within a Synchronous Dynamic Random Access Memory (SDRAM) 401. The data may be received from either a communication channel or from a local memory, such as, for example, a hard disc or a DVD.

The data output from the presentation buffer 403 may then be passed to a data transport processor 405. The data transport processor 405 may demultiplex the transport stream into packetized elementary stream constituents, and passes the audio transport stream to an audio decoder 415 and to a video decoder 409, for example. The audio data may then be sent to the output blocks, and the video may be sent to a display engine. Additionally, Record data may be sent to Record functions such as, for example, the Record software 416. The RAVE may be, for example, a data transport processor such as, the data transport processor 405. In an embodiment of the present invention, the transport stream may comprise record data, and audio/video data.

Figure 5:
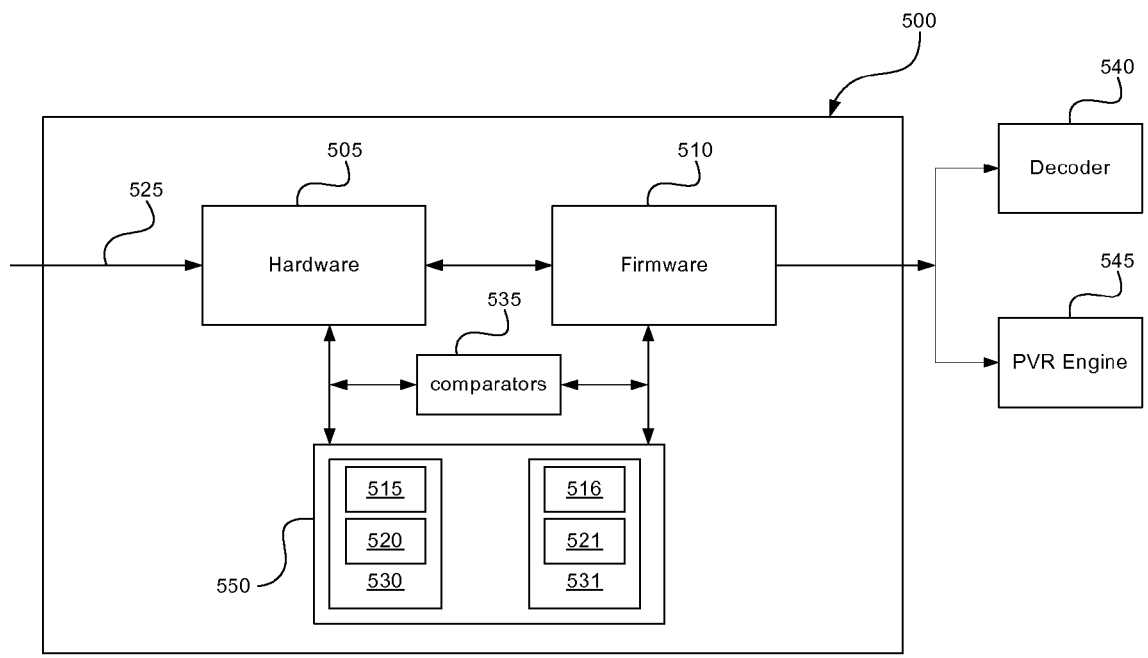
FIG. 5 illustrates a block diagram of the path of packets in an exemplary RAVE, in accordance with an embodiment of the present invention.

FIG. 5 illustrates a block diagram of the path of packets in an exemplary RAVE, in accordance with an embodiment of the present invention. The RAVE 500 may comprise a hardware assist block 505, a firmware block 510, generic comparators 535, and a memory block 550. The input 525 may comprise transport data, where the transport data may comprise packets of video, audio, and record data. An input packet 525 may be received by the hardware assist 505, where some processing may take place. Packets may comprise AV data or Record data. The hardware assist 505 may partially process the received packet 525.

The data within the received packet 525 may be separated into sets of DRAM buffers 530 and 531, which may be part of the memory block 550 or may comprise a memory unit separate from the memory block 550. Each set of the DRAM buffers 530 and 531 may comprise a compressed data buffer (CDB) 515 and 516 and a descriptor buffer (ITB) 520 and 521, respectively.

The hardware assist block 505 may perform some processes and pass processed data to firmware block 510. A portion of the processed data may be passed from the hardware assist block 505 to the memory block 550, which may then be accessed by the firmware block 510. U.S. patent application Ser. No. 11/385,468 filed Mar. 21, 2006, discusses several approaches of interfacing the hardware assist 505 and the firmware 510. Accordingly, U.S. patent application Ser. No. 11/385,468 filed Mar. 21, 2006, is hereby incorporated herein by reference in its entirety.

A current packet, packet A, may come into the system 500 via input 525. The hardware assist 505 may perform a portion of the functions associated with the processing of packet A, and may retrieve information associated with packet A as well. The hardware assist 505 may then set up the hardware assist fields and may write retrieved information to a location in the memory block 550 such as, for example, a buffer 530. The hardware assist field may comprise, for example, address of compare pattern, compare patterns, staff/end of PES headers, number of ES bytes in the packet, number of payload bytes in the packet, start of payload, presence of packet errors, type of packet (record or audio/video), etc. These fields and their uses are explored further in U.S. patent application Ser. No. 11/385,468 filed Mar. 21, 2006, and U.S. patent application Ser. No. 11/328,877 filed Jan. 10, 2006. Accordingly, each of U.S. patent application Ser. No. 11/385,468 filed Mar. 21, 2006, and U.S. patent application Ser. No. 11/328,877 filed Jan. 10, 2006, is incorporated herein by reference in its entirety.

After the hardware assist 505 performs the portion of the functions assisted with the first packet A, the firmware 510 may then access and begin processing the data associated with the first packet A from the buffer 530, and output the processed data A. Meanwhile, while the firmware 510 is processing the previously received first packet A, the hardware assist 505 may process packet B (a second packet) and write the associated retrieved data in another location in the memory block 550 such as, for example, a buffer 531. The firmware 510 may then begin processing the packet B from the buffer 531, and the hardware assist 505 may process the next packet C (a third packet) and write the associated information in the buffer 530, overwriting the data associated with the packet A previously processed by the firmware 510.

In an embodiment of the invention, generic comparators 535 may be utilized in the system 500 to detect certain data patterns within the data packets. The generic comparators 535 may be dynamically configured to trap on different compare patterns per context, with different number of compare pattern lengths and mask bits. While the hardware assist 505 may be processing a data packet, the generic comparators 535 may identify frame syncs within the data and extract the data associated with the frame sync, which the firmware 510 may utilize in further processing of the data packets. The comparators 535 may extract data from the stream at any bit boundary location and put the data into a format that is easily processed by the firmware 510. The generic comparators 535 may provide the speed of hardware-based comparators while providing flexibility of a full firmware-based solution. Compare and extract operations associated with the firmware 510 may as a result function as fast as hardware, with flexibility associated with firmware 510. In certain embodiments where the compare pattern may be too long for the comparators to detect, the firmware 510 may set up the comparators 535 to detect part of the pattern and then finish comparison of the remainder of the pattern manually using a software solution. Using the comparators 535 may also assist downstream audio/video decoders 540 in achieving frame sync, where sync information may be utilized in more efficient decoding of the audio and video content.

The comparators 535 may scan incoming packet data for a configured pattern associated with the data format. Several patterns may be scanned for each data stream such as, for example, patterns associated with audio and video content. When a compare pattern is found, the comparators 535 may skip a predetermined number of bits, extract another specified number of bits from the stream, align the extracted bits to the nearest byte boundary, calculate the packet byte offset of the last byte of extracted data, and send the extracted data plus the packet byte offset to data memory. Additionally, for example, a "valid byte" may also be sent to data memory that may contain miscellaneous information including the comparator from which this extracted data originated. A running count of the number of compare patterns seen in the current packet may be kept by the hardware portion of the RAVE. At the end of the packet time, this count may be sent to data memory at a location just above the first compare pattern.

On the next packet time, the firmware 510 may look at the pattern count, and check to see whether there are any sync patterns in the current packet. If there is at least one, the firmware 510 may enter a loop where it reads the stream-extracted data provided by the comparators 535, and write them to an address that causes the data to be loaded into an ITB entry. These ITB entries may then be utilized by downstream video/audio decoders 540 to decode the data packets.

Utilizing the generic comparators 535 may provide flexibility for usage with all data formats as well as new data formats, while providing enough hardware assist 505 to enable the firmware 510 to meet its throughput requirements. As such, the comparators 535 implemented in the system 500 may be generically configured to trap on a large variety of patterns, and can trap on a different set of patterns for each supported context. The comparators 535 may also will extract data at a location somewhere after the compare pattern is seen, align it, format it in such a way that it can be used efficiently by the firmware 510, and then write the extracted data to data memory 550 for use by the firmware 510 at the next packet time.

In an embodiment of the present invention, the hardware assist 505 may store the partially processed packets in a CDB 515 or 516 in the memory block 530 or 531, respectively. The generic comparators 535 may perform their function of detecting the frame synch data within the packets and provide the information to the firmware 510. The firmware 510 may utilized the information provided by the comparators 535 to determine the location of the audio and/or video frame syncs within the packets and storing the corresponding information in an ITB entry in the ITB 520 or 521.

Accordingly, the present invention may be realized in hardware, software, or a combination thereof. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for processing a plurality of packets, said system comprising:
   a first circuit for:
      receiving a packet,
      parsing the packet,
      first determining a type of the packet, and
      second determining the locations of one or more fields in the packet;
   at least one comparator for detecting at least one data pattern associated with the packet; and
   a second circuit for:
      checking the at least one data pattern for frame sync patterns,
      sorting the frame sync patterns, and
      writing the frame sync patterns to a buffer.

2. The system according to claim 1, wherein the first circuit is hardwired.

3. The system according to claim 1, wherein the second circuit comprises a processor.

4. The system according to claim 1, wherein the at least one data pattern comprises synchronization information associated with audio content of the packet.

5. The system according to claim 1, wherein the at least one data pattern comprises synchronization information associated with video content of the packet.

6. The system according to claim 1, wherein the at least one comparator is programmable.

7. A method for processing a plurality of packets, said method comprising:
   receiving a packet of said plurality of packets;
   parsing the packet;
   first determining a type of the packet;
   second determining the locations of one or more fields in the packet;
   using the type to detect at least one data pattern associated with the packet; and
   checking the at least one data pattern for frame sync patterns;
   sorting the frame sync patterns; and
   writing the frame sync patterns to a buffer.

8. The method according to claim 7, wherein a hardwired circuit receives and processes the packet.

9. The method according to claim 7, wherein a processor reads the at least one data pattern.

10. The method according to claim 7, wherein the at least one data pattern comprises synchronization information associated with audio content of the packet.

11. The method according to claim 7, wherein the at least one data pattern comprises synchronization information associated with video content of the packet.

12. The method according to claim 11, further comprising:
   determining the synchronization information associated with the video content of the packet; and
   utilizing the determined synchronization information associated with the video content of the packet to determine synchronization information associated with audio content of the packet.

13. The method according to claim 7, wherein the detecting is performed by at least one programmable comparator.

14. A method comprising:
   comparing incoming packet data for a pattern associated with a data format; and
   when said pattern is found:
      skipping a predetermined number of bits,
      extracting a specified number of bits to generate extracted bits that provide frame sync information,
      aligning said extracted bits to a nearest byte boundary,
      calculating a packet byte offset of a last byte of said extracted bits, and
      transmitting said extracted bits and said packet byte offset to a memory.

15. The method of claim 14 wherein a running count of a number of compare patterns seen in a packet of said incoming packet data is stored in a memory.

16. The method of claim 14 wherein said frame sync information is used by a video decoder.

17. The method of claim 14 wherein said frame sync information is used by an audio decoder.

18. A system comprising:
   one or more circuits operable for, at least:
      comparing incoming packet data for a pattern associated with a data format; and
      when said pattern is found,
         skipping a predetermined number of bits,
         extracting a specified number of bits to generate extracted bits that provide frame sync information,
         aligning said extracted bits to a nearest byte boundary,
         calculating a packet byte offset of a last byte of said extracted bits, and
         transmitting the extracted data and said packet byte offset to a memory.

19. The system of claim 18 wherein a running count of a number of compare patterns seen in a packet of said incoming packet data is stored in a memory.

20. The method of claim 18 wherein said frame sync information is used by a video decoder.

21. The method of claim 18 wherein said frame sync information is used by an audio decoder.

* * * * *